United States Patent [19]
Gokan et al.

[11] Patent Number: 5,408,648
[45] Date of Patent: Apr. 18, 1995

[54] METHOD AND APPARATUS FOR DIAGNOSING CPU FOR CPU-RUNAWAY-PREVENTING CIRCUIT

[75] Inventors: Yoshiaki Gokan; Shigeru Akaishi, both of Isesaki, Japan

[73] Assignee: Japan Electronic Control Systems Co., Ltd., Isesaki, Japan

[21] Appl. No.: 999,579

[22] Filed: Dec. 30, 1992

Related U.S. Application Data

[63] Continuation of Ser. No. 384,780, Jul. 25, 1989, abandoned.

[51] Int. Cl.⁶ .............................................. G06F 11/00
[52] U.S. Cl. .................... 395/575; 364/264.1; 364/265; 364/264.5; 364/DIG. 1
[58] Field of Search .................. 395/575, 650, 700

[56] References Cited

U.S. PATENT DOCUMENTS

| | | | |
|---|---|---|---|
| 4,683,859 | 8/1987 | Tamura et al. ...................... | 123/491 |
| 4,775,957 | 10/1988 | Yakuwa et al. ..................... | 395/575 |
| 4,903,193 | 2/1990 | Nakamura ........................... | 395/575 |
| 4,945,335 | 7/1990 | Kimura et al. ...................... | 340/426 |
| 5,212,797 | 3/1993 | Miyake et al. ...................... | 395/750 |

FOREIGN PATENT DOCUMENTS 62-49468  3/1987  Japan .

*Primary Examiner*—Kevin A. Kriess
*Assistant Examiner*—John Q. Chavis
*Attorney, Agent, or Firm*—Foley & Lardner

[57] ABSTRACT

A method and apparatus for preventing runaway of CPU using a battery voltage as a power source voltage, in which the operation of CPU and the power source voltage of the CPU are inspected at the abnormal operation of the CPU and/or at the abnormal reduction of the power source voltage of CPU, system resetting is effected on the CPU, system reset signals for the CPU are counted. When the number of system reset signals for a predetermined time satisfies predetermined conditions, it is judged that the CPU is in failure. When the abnormal reduction of the power source voltage of the CPU is detected, the counting of system reset signals is prohibited.

7 Claims, 3 Drawing Sheets

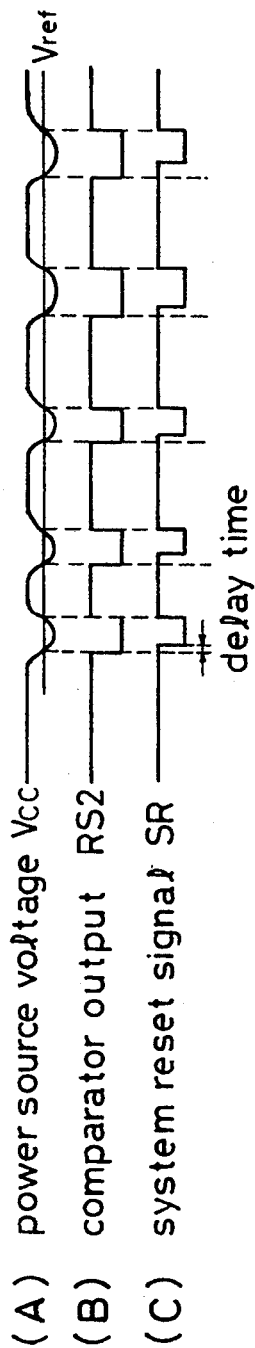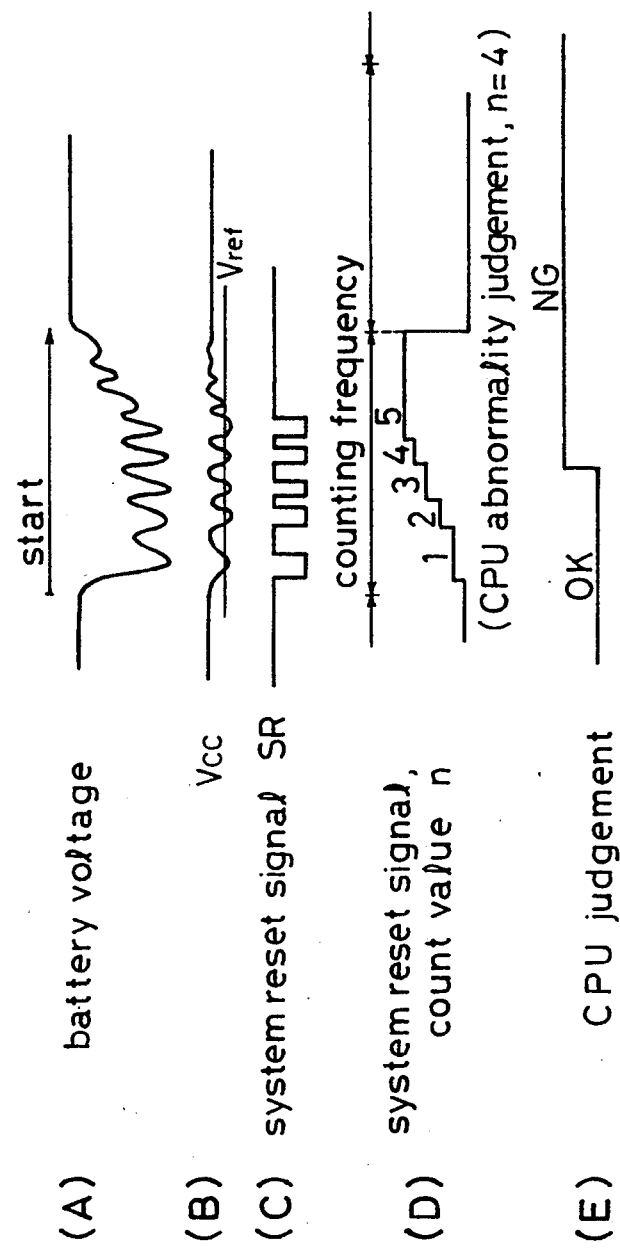

METHOD AND APPARATUS FOR DIAGNOSING CPU FOR CPU-RUNAWAY-PREVENTING CIRCUIT

This application is a continuation of application Ser. No. 07/384,780, filed Jul. 25, 1989, now abandoned.

BACKGROUND OF THE INVENTION (1) Field of the Invention

The present invention relates to a method and apparatus for preventing runaway of a central processing unit (CPU) of a microcomputer. More particularly, the present invention relates to a technique of improving the precision of a failure determination in a vehicle-controlling CPU which is driven by a battery power source.

(2) Description of the Related Art

In the case where a microcomputer driven by a battery power source is used as a means for affecting various controls in an automobile engine or the like, a runaway-preventing circuit is generally disposed as a safety means.

In this runaway-preventing circuit, an abnormality of the CPU is detected from a program run signal from the CPU, and at the detection of the abnormality, a reset signal (system reset signal) is output to the CPU to initialize the system (see Japanese Patent Application Laid-Open Specification No. 61-86847).

Furthermore, for effecting a normal operation in the microcomputer, a predetermined power source voltage should be applied, and if the applied voltage is lower than the predetermined power source voltage, runaway of CPU is caused. Accordingly, also at the time of reduction of the power source voltage, the system reset signal is output to prevent runaway of the CPU (see Japanese Patent Application Laid-Open Specification No. 61-42001).

Namely, in the conventional runaway-preventing circuit, at the time of detection of an abnormality and/or at the time of reduction of the power source voltage, a system reset signal is output to the CPU to reset the CPU to the initial stage and prevent runaway of the CPU, and when the number of system reset signals output to the CPU during a unit time exceeds a predetermined value, the CPU is judged to have failed.

However, in the conventional technique, failure is judged according to the number of reset signals output to the CPU by using the combination of reset signals based on program run signals and reset signals based on the reduction of the battery voltage, and therefore, if this conventional circuit is used as a means for controlling an automobile engine, as shown in FIG. 4, at the time of reduction of the battery voltage upon starting the engine where power consumption is large, the frequency of reduction of the battery voltage to the CPU below the reference voltage increases and the reset signals are incessantly output to the CPU. Therefore, the count number n of reset signals exceeds the set number (for example, the failure judgement is made in case of $n \geq 4$). Accordingly, even in the case of the CPU operating normally, because this reduction of the voltage, it is erroneously determined that the CPU has failed.

SUMMARY OF THE INVENTION

It is an object therefore, of the present invention to solve the foregoing problems of conventional techniques. It is therefore a primary object of the present invention to provide a method and apparatus in which, even if a system reset signal is output to the CPU based on reduction of the battery voltage, the CPU is not judged to have failed, whereby an erroneous judgement of CPU failure is prevented.

Another object of the present invention is to provide a method and apparatus in which the above-mentioned erroneous judgement of CPU failure can be prevented by a simple circuit structure.

In accordance with the present invention, these objects can be attained by a method for preventing runaway of a CPU, which comprises inspecting an operation of the CPU using a battery voltage as the power source voltage of the CPU. A system reset signal is generated to the CPU at the time of an abnormal operation of CPU and/or at the time of an abnormal reduction of the power source voltage of CPU. The number of system reset signals is counted, and the CPU is determined in failure when the count number for a predetermined time satisfies predetermined conditions. The counting is prohibited when the abnormal reduction of the power source voltage of the CPU is detected.

Furthermore, in accordance with the present invention, there is provided an apparatus for preventing runaway of a CPU using a battery voltage as the power source voltage, which comprises CPU inspecting means for inspecting an operation of CPU. A first reset signal is output when an abnormality is detected in the operation of CPU. Also included is power source voltage inspecting means for inspecting the power source voltage and outputting a second reset signal when the power source voltage is abnormally reduced. Further included is system resetting means for outputting a system reset signal to CPU when the first reset signal and/or the second reset signal is output, and CPU failure judging means for judging failure of CPU when the system reset signal satisfies predetermined conditions. Additionally, included is CPU failure judgement prohibiting means for prohibiting the CPU failure judging means from making the CPU failure judgement based on the system reset signal when the second reset signal is output.

In the present invention, the CPU failure judging means can be a circuit for counting system reset signals output from the system resetting means and judging failure of the CPU when the count number for a predetermined time exceeds a predetermined value.

In this structure, if a reset signal is output from the CPU inspecting circuit or the power source voltage inspecting circuit, the system resetting circuit outputs a system reset circuit to the CPU to reset the CPU.

The CPU failure judging circuit counts the number of system reset signals output to CPU from the system resetting circuit, and judges that the CPU failed when the count number for a predetermined time exceeds a predetermined value. However, when a reset signal is output from the power source voltage inspecting circuit, counting by means of system reset signals is prohibited by the CPU failure judgement prohibiting circuit.

Accordingly, if a reset signal is output from the CPU inspecting circuit or the power source voltage inspecting circuit, a system reset signal is output to the CPU. At the time of abnormal reduction of the power source voltage, however, the CPU is not always in failure. Hence, in such a case, the judgement that the CPU failed is not made.

In the present invention, the reset signal from the power source voltage inspecting circuit may be input to the system resetting circuit through a delay circuit.

In this structure, the output signal of the system resetting circuit is used as the count prohibiting signal for assuredly controlling the operation of the CPU failure judgement prohibiting circuit. Then, after a lapse of a predetermined time, the system reset signal of the system resetting circuit is processed by the CPU failure judgement prohibiting circuit and failure of CPU can be determined. Thus, counting of system reset signals at the time of the abnormal reduction of the power source voltage can be assuredly prevented, and an erroneous judgement can be prevented.

One embodiment of the present invention will now be described in detail with reference to the accompanying drawings.

BRIEF DESCRIPTION OF THE DRAWINGS

FIG. 3, consisting of (A)–(C), is a time chart illustrating signal characteristics in the circuit shown in FIG. 2.

FIG. 4 consisting of (A)–(e) is a time chart illustrating the problems involved in the conventional runaway preventing circuit.

DETAILED DESCRIPTION OF THE PREFERRED EMBODIMENT

Figure 1:
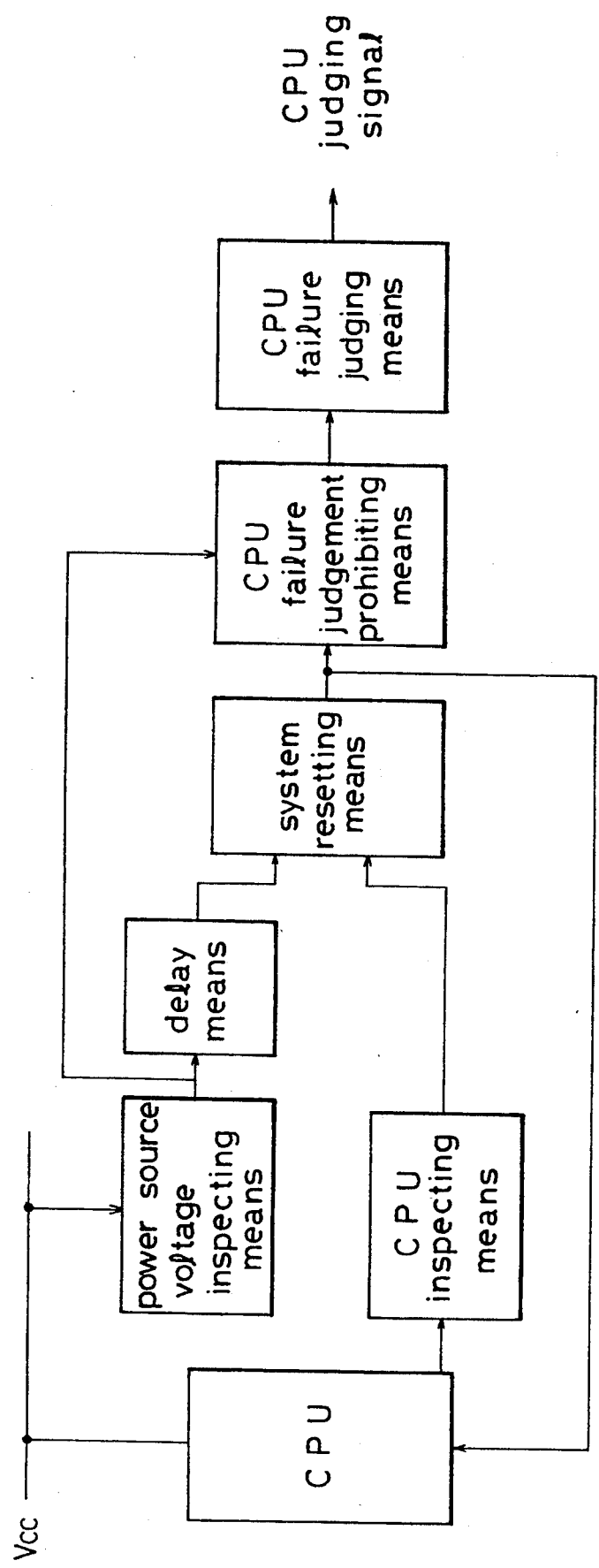
FIG. 1 is a block diagram illustrating the outline of the present invention.
Figure 2:
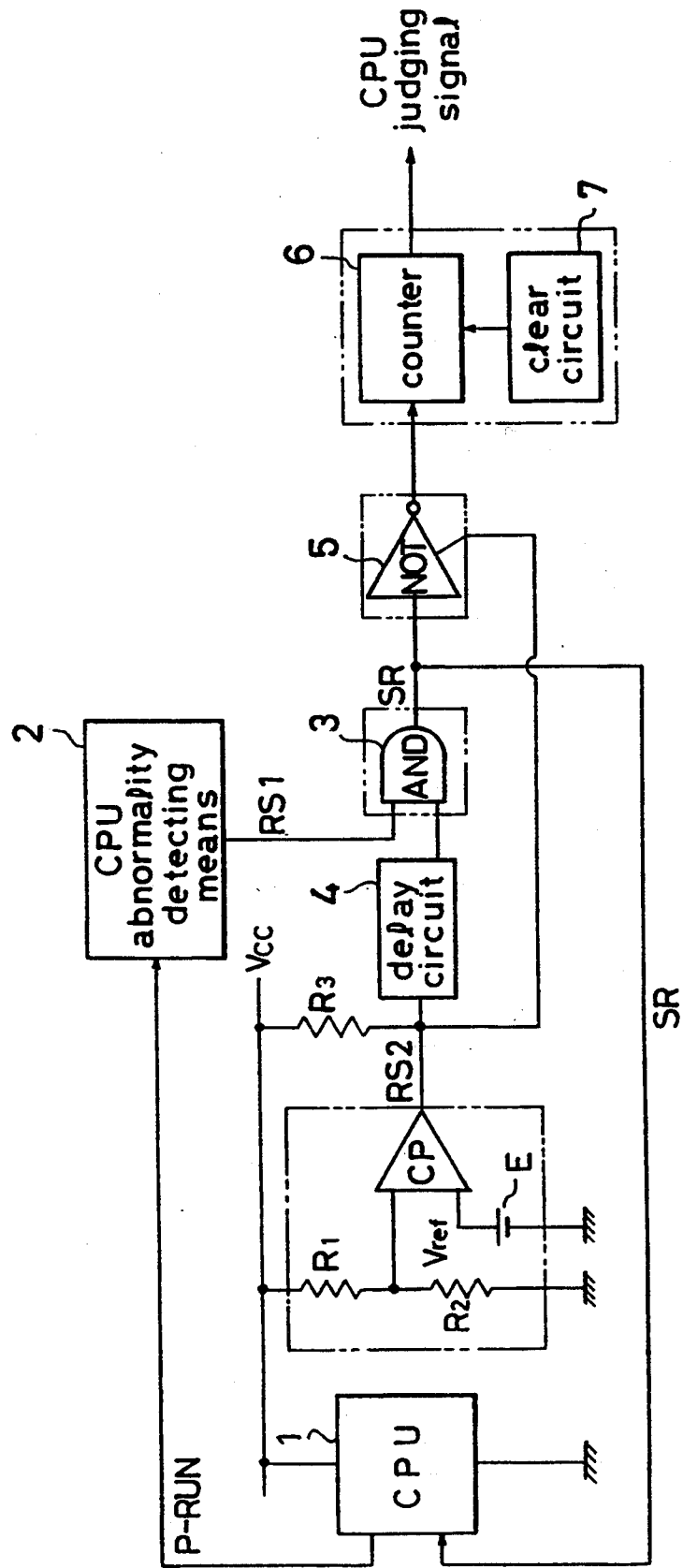
FIG. 2 is a circuit diagram illustrating an embodiment of the present invention.

The outline of the present invention is illustrated in FIG. 1, and an embodiment of the invention is illustrated in FIG. 2.

In the circuit shown in FIG. 2 a power source voltage Vcc is applied to a CPU 1 from a battery. A program run signal (P-RUN signal) output from the CPU 1 is input to a CPU abnormality detecting circuit 2 acting as a CPU inspecting circuit.

The CPU abnormality detecting circuit 2 detects an abnormality of the CPU 1 by inputting the P-RUN signal to a known detecting circuits for example a watch dog timer disposed in the CPU abnormality detecting circuit 2. When the CPU 1 normally operates (normal run), the CPU abnormality detecting circuit 2 outputs a high-level signal on one input terminal of an AND circuit 3. When an abnormality of the CPU 1 is detected, the CPU abnormality detecting circuit 2 outputs a low-level signal (reset signal).

The power source voltage Vcc is divided by voltage dividing resistors R1 and R2, and the divided voltage is input to one input terminal of a comparator CP. A reference voltage Vref of a battery E is input to the other input terminal. The comparator CP compares the divided voltage formed by dividing the power source voltage Vcc by the voltage dividing resistors R1 and R2 with the reference voltage Vref, and the comparator CP outputs a high-level signal at the normal power source voltage Vcc, that is, when the divided voltage of the power source voltage Vcc is higher than the reference voltage Vref, as shown in FIG. 3. However, when the power source voltage Vcc is lowered so that the divided value of the power source voltage Vcc is lower than the reference voltage Vref, that is, at the time of an abnormality, the comparator CP outputs a low-level signal (reset signal) RS2. The abnormal state where the divided voltage of the power source voltage Vcc is lower than the reference voltage Vref includes not only the state where the power source is deteriorated and there is a risk of runaway of CPU, but also the power source voltage normal state where the power source voltage is drastically reduced during starting of the engine. In the present embodiment, the power source voltage inspecting circuit is constructed by the voltage dividing resistors R1 and R2, the battery E and the comparator CP.

The output signal RS2 from the comparator CP is input to the other input terminal of the AND circuit 3 through a delay circuit 4. Accordingly, the output signal RS1 from the CPU abnormality detecting circuit 2 and the output signal RS2 from the comparator CP through the delay circuit 4 are input to the AND circuit 3. When both of these two input signals are high-level signals, that is, when the power source voltage Vcc is normal and an abnormality of the CPU is not detected by the CPU abnormality detecting circuit 2, the AND circuit 3 outputs a high-level signal. When one of the two input signals is a low-level signal or when both of the two input signals are low-level signals, the AND circuit 3 outputs a low-level signal (system reset signal) SR on one input terminal of the CPU 1.

More specifically, when an abnormality of the CPU 1 is detected by the CPU abnormality detecting circuit 2 abnormal detection of the power source voltage Vcc is detected, the AND circuit 3 inputs a low-level signal to the CPU 1 as shown in FIGS. 3(A) through 3(C). When this low-level signal is input to the CPU 1 as the system reset signal, the CPU 1 is reset and initialized and runaway of CPU 1 is prevented. The AND circuit 3 corresponds to the system resetting circuit.

The output signal SR of the AND circuit 3 is input to the CPU 1, and simultaneously, the signal SR is input to an input terminal of a NOT circuit 5 acting as the CPU failure judgement prohibiting means. The signal from the AND circuit 3 is inverted by the NOT circuit 5. When the low-level signal is output as the system reset signal SR from the AND circuit 3, this low-level signal is inverted to a high-level signal and is output from the NOT circuit 5. The system reset signal inverted to the high-level signal is counted by a counter 6.

The counter 6 is reset to zero at a predetermined frequency by a clear circuit 7. For each counting time, high-level signals (corresponding to system reset signals SR) are counted. If the count number exceeds a predetermined number, for example, 4, the counter 6 determines that the CPU 1 is in failure and the counter 6 outputs a failure judgement signal. Accordingly, the CPU failure judging circuit includes the counter 6 and the clear circuit 7.

The NOT circuit 5 is arranged so that the NOT circuit 5 is actuated only when the output signal RS2 from the comparator CP is a high-level signal (the power source voltage Vcc is at a normal high level). At the time of reduction of the power source voltage Vcc when the output signal RS2 from the comparator CP is a low-level signal, the operation of the NOT circuit 5 is stopped (the CPU failure judgement is prohibited).

Accordingly, in the state where reduction of the power source voltage Vcc is detected by the comparator CP and the system reset signal SR is output to the CPU 1 from the AND circuit 3, the CPU 1 is reset by the system reset signal. However, since counting of system reset signals SR is stopped, the judgement of failure of the CPU 1 is prohibited from being made based on the reduction of the power source voltage Vcc. For example, in the case where the CPU 1 is used for controlling an engine of an automobile, the reduction of the power source voltage Vcc during starting of the engine is a normal operation, and the judgement of failure of the CPU 1 is prevented at this time. In the present embodiment, the CPU failure judgement prohibiting means or system reset signal count prohibiting means includes the NOT circuit 5.

The reason why the output signal RS2 from the comparator CP is output into the AND circuit 3 through the delay circuit 4 is that by first controlling the operation of the NOT circuit 5 based on the output signal RS2, and then next processing the later input to the NOT circuit 5 from the AND circuit 3, counting of system reset signals can be avoided at the time of reduction of the power source voltage Vcc.

According to the present invention, when a system reset signal is output to the CPU due to reduction of the power source voltage, the CPU failure judgement is prohibited by prohibition of counting of system reset signals or the like, and the CPU failure determination based on this count number can be avoided. Accordingly, for example, in the state where the CPU is used for controlling an automobile engine, the CPU is system-reset by the reduction of the power source voltage caused by starting of the engine. Nevertheless, the CPU is not always in failure. In this case, a failure judgement can be prevented from being erroneously made according to the present invention.

We claim:

1. An apparatus for diagnosing a CPU failure comprising:

a power source supplying voltage to a CPU;

CPU inspecting means, connected to a program-run output of the CPU, for inspecting program-run signals provided over the program-run output of the CPU, and outputting CPU abnormal signals when the inspection of the program-run signals indicates an abnormal condition of the CPU;

power source inspecting means, connected to the power source, for monitoring the voltage supplied by the power source and outputting power source abnormal signals when the monitoring of the voltage indicates an abnormal reduction of the voltage;

delay means, connected to the power source inspecting means, for receiving the power source abnormal signals and outputting delayed power source abnormal signals;

reset signal supplying means having a first input connected to the CPU inspecting means for receiving the CPU abnormal signals and a second input connected to the delay means for receiving the delayed power source abnormal signals, the reset signal supplying means outputting reset signals upon receipt of at least one of the CPU abnormal signals and the delayed power source abnormal signals, the reset signals output from the reset signal supplying means being provided to the CPU to reset the CPU to prevent CPU runaway;

reset signal input prohibiting means connected to the reset signal supplying means for receiving the reset signals, the reset signal input prohibiting means being also connected to the power source inspecting means for receiving the power source abnormal signals, the reset signal input prohibiting means passing the reset signals only when the power source inspecting means is not outputting the power source abnormal signals;

counting means connected to the reset signal input prohibiting means for receiving the reset signals passed by the reset signal input prohibiting means and outputting a CPU failure diagnosis signal upon receipt of a predetermined number of reset signals over a predetermined period of time, wherein the counting means only counts the reset signals that are due to CPU failure and the counting means does not count the reset signals due to voltage abnormalities.

2. The apparatus of claim 1, wherein the reset signal supplying means comprises an AND gate, and the CPU abnormal signals, the power source abnormal signals, the delayed power source abnormal signals and the reset signals are all active-low, such that the input of at least one of the active-low CPU abnormal signals and the active-low delayed power source abnormal signals results in the output of an active-low reset signal from the AND gate, the active-low reset signal resetting the CPU.

3. The apparatus of claim 2, wherein the reset signal input prohibiting means comprises a NOT circuit which inverts the active-low reset signals, thus passing active-high reset signals to the counting means when the power source inspecting means is not outputting the power source abnormal signals.

4. An apparatus for diagnosing CPU failure comprising:

a power source supplying voltage to a CPU;

a CPU inspecting circuit, connected to a program-run output of the CPU, inspecting program-run signals provided by the CPU over the program-run output, and outputting CPU abnormal signals when the inspection of the program-run signals indicates an abnormal condition of the CPU;

a power source inspecting circuit, connected to the power source, monitoring the voltage supplied by the power source and outputting power source abnormal signals when the monitoring of the voltage indicates an abnormal reduction of the voltage;

a delay circuit, connected to the power source inspecting circuit, receiving the power source abnormal signals and outputting delayed power source abnormal signals;

a reset signal supplying circuit having a first input connected to the CPU inspecting circuit for receiving the CPU abnormal signals and a second input connected to the delay circuit for receiving the delayed power source abnormal signals, the reset signal supplying circuit outputting reset signals upon receipt of at least one of the CPU abnormal signals and the delayed power source abnormal signals, the reset signals being provided to the CPU to reset the CPU to prevent CPU runaway;

a reset signal input prohibiting circuit connected to the reset signal supplying circuit for receiving the reset signals, the reset signal input prohibiting circuit being also connected to the power source inspecting circuit for receiving the power source abnormal signals, the reset signal input prohibiting circuit passing the reset signals only when the power source inspecting circuit is not outputting the power source abnormal signals; and a counting circuit connected to the reset signal input prohibiting circuit for receiving the reset signals passed by the reset signal input prohibiting circuit and outputting a CPU failure diagnosis signal upon receipt of a predetermined number of reset signals over a predetermined period of time, wherein the counting circuit only counts the reset signals that are due to CPU failure and the counting circuit does not count the reset signals that are due to voltage abnormalities.

5. The apparatus of claim 4, wherein the reset signal supplying circuit comprises an AND gate, and the CPU abnormal signals, the power source abnormal signals, the delayed power source abnormal signals and the reset signals are all active-low, such that the input of at least one of the active-low CPU abnormal signals and the active-low delayed power source abnormal signals results in the output of an active-low reset signal from the AND gate, the active-low reset signal resetting the CPU.

6. The apparatus of claim 5, wherein the reset signal input prohibiting circuit comprises a NOT circuit which inverts the active-low reset signals, thus passing active-high reset signals to the counting circuit when the power source inspecting circuit is not outputting the power source abnormal signals.

7. A method of diagnosing a CPU comprising the steps of:
  inspecting a voltage supplied to the CPU;
  inspecting program-run signals output by the CPU;
  outputting, based on at least one of an abnormal reduction in the voltage and an abnormal condition of the program-run signals, reset signals to reset the CPU;
  outputting prohibiting signals when the reset signals are based on an abnormal reduction in the voltage;
  counting the reset signals occurring in the absence of the prohibiting signals; and
  outputting a CPU failure diagnosis signal when a predetermined number of reset signals are counted within a predetermined period of time, such that the reset signals counted do not include reset signals based on an abnormal reduction in the voltage.

* * * * *